(12) United States Patent
Ashikhmin et al.

(10) Patent No.: US 8,422,541 B2
(45) Date of Patent: Apr. 16, 2013

(54) CHANNEL ESTIMATION IN A MULTI-CHANNEL COMMUNICATION SYSTEM USING PILOT SIGNALS HAVING QUASI-ORTHOGONAL SUBPILOTS

(75) Inventors: Alexei E. Ashikhmin, Morristown, NJ (US); Philip Alfred Whiting, New Providence, NJ (US)

(73) Assignee: Alcatel Lucent, Paris (FR)

( * ) Notice: Subject to any disclaimer, the term of this patent is extended or adjusted under 35 U.S.C. 154(b) by 952 days.

(21) Appl. No.: 12/474,432

(22) Filed: May 29, 2009

(65) Prior Publication Data

US 2010/0303136 A1 Dec. 2, 2010

(51) Int. Cl.
*H04B 1/38* (2006.01)

(52) U.S. Cl.
USPC ........... 375/222; 375/219; 375/220; 375/221; 375/260; 375/295

(58) Field of Classification Search .................. 375/130, 375/211, 219, 220, 221, 222, 223, 260, 295, 375/316
See application file for complete search history.

(56) References Cited

U.S. PATENT DOCUMENTS

| | | | | |
|---|---|---|---|---|
| 5,852,630 A * | 12/1998 | Langberg et al. | ............. | 375/219 |
| 6,693,992 B2 | 2/2004 | Jones et al. | | |
| 6,829,293 B2 | 12/2004 | Jones et al. | | |
| 6,985,521 B1 | 1/2006 | Rezvani et al. | | |
| 7,554,944 B2 * | 6/2009 | Garmonov et al. | ........... | 370/329 |
| 7,843,949 B2 * | 11/2010 | Xu | ................................ | 370/401 |
| 8,018,868 B2 * | 9/2011 | Nuzman et al. | ................ | 370/252 |
| 8,126,042 B2 * | 2/2012 | Schenk et al. | ................ | 375/227 |
| 8,194,767 B2 * | 6/2012 | Duvaut et al. | .................. | 375/260 |
| 8,254,911 B1 * | 8/2012 | Lee | ................................ | 455/425 |
| 2007/0014272 A1 * | 1/2007 | Palanki et al. | ................ | 370/344 |
| 2007/0249402 A1 * | 10/2007 | Dong et al. | ................ | 455/562.1 |
| 2008/0285740 A1 * | 11/2008 | Schelstraete et al. | ..... | 379/406.06 |
| 2009/0073867 A1 * | 3/2009 | Schenk | .......................... | 370/201 |
| 2009/0092036 A1 * | 4/2009 | Peeters et al. | ................ | 370/201 |
| 2009/0110033 A1 * | 4/2009 | Shattil | ........................... | 375/141 |
| 2009/0190634 A1 * | 7/2009 | Bauch et al. | ................... | 375/211 |
| 2009/0271550 A1 * | 10/2009 | Clausen et al. | ............... | 710/269 |
| 2010/0046684 A1 * | 2/2010 | De Lind Van Wijngaarden et al. | .............................. | 375/363 |

(Continued)

OTHER PUBLICATIONS

X. Hou et al., "A Time-Domain Approach for Channel Estimation in MIMO-OFDM-Based Wireless Networks," IEICE Trans. Commun., Jan. 2005, pp. 3-9, vol. E88-B, No. 1.

(Continued)

*Primary Examiner* — Hirdepal Singh
(74) *Attorney, Agent, or Firm* — Ryan, Mason & Lewis, LLP

(57) ABSTRACT

An access node of a communication system comprises a plurality of transmitters adapted for communication with at least one receiver. The access node is operative to transmit pilot signals from respective associated ones of the transmitters, to estimate channel coefficients between the transmitters and the receiver, and to utilize the estimated channel coefficients to control at least one data signal sent by at least one of the transmitters. The pilot signals are partitioned into a plurality of sets of pilot signals such that pilot signals from the same set have respective subpilots that are orthogonal to one another and pilot signals from different sets have respective subpilots that are not orthogonal to one another but are instead quasi-orthogonal to one another. The pilot signals are associated with the respective transmitters based on the partitioning of the pilot signals into sets.

20 Claims, 4 Drawing Sheets

U.S. PATENT DOCUMENTS

2010/0128767 A1* 5/2010 Zirwas ................... 375/222
2010/0202554 A1* 8/2010 Kramer et al. ............. 375/285
2012/0224685 A1* 9/2012 Schenk et al. .......... 379/406.08

OTHER PUBLICATIONS

ITU Recommendation, COM 15-C 177-E, "G.vds12: Pilot Sequence Assisted Vector Channel Estimation," Study Group 15—Contribution 177, Upzide Labs, pp. 1-6, Oct. 2006.

ITU Recommendation, COM 15-C 685-E, "G.vector: Advantages of Using a Startup Sequence for Joining Event," Study Group 15—Contribution 685, Infineon Technologies North American, pp. 1-3, Jan. 2008.

U.S. Appl. No. 12/352,896 filed in the name of A. Ashikhmin et al. on Jan. 13, 2009 and entitled "Power Control Using Denoised Crosstalk Estimates in a Multi-Channel Communication System."

U.S. Appl. No. 12/060,653 filed in the name of A. Ashikhmin et al. on Apr. 1, 2008 and entitled "Fast Seamless Joining of Channels in a Multi-Channel Communication System."

U.S. Appl. No. 12/370,148 filed in the name of G. Kramer et al. on Feb. 12, 2009 and entitled "Simultaneous Estimation of Multiple Channel Coefficients Using a Common Probing Sequence."

* cited by examiner

FIG. 5

$S_1 = \{$ $v_1 = \frac{1}{8}(1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1)$, $v_2 = \frac{1}{8}(1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1,1,-1)$, $v_3 = \frac{1}{8}(1,1,-1,-1,1,1,-1,-1,1,1,-1,-1,1,1,-1,-1,1,1,-1,-1,1,1,-1,-1,1,1,-1,-1,1,1,-1,-1,1,1,-1,-1,1,1,-1,-1,1,1,-1,-1,1,1,-1,-1,1,1,-1,-1,1,1,-1,-1,1,1,-1,-1,1,1,-1,-1)$, ...$\}$ $S_2 = \{$ $v_{17} = \frac{1}{8}(1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1)$, $v_{18} = \frac{1}{8}(1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1)$, $v_{19} = \frac{1}{8}(1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1,1,1,-1,1)$, ...$\}$

CHANNEL ESTIMATION IN A MULTI-CHANNEL COMMUNICATION SYSTEM USING PILOT SIGNALS HAVING QUASI-ORTHOGONAL SUBPILOTS

FIELD OF THE INVENTION

The present invention relates generally to communication systems, and more particularly to techniques for controlling crosstalk between communication channels in such systems.

BACKGROUND OF THE INVENTION

As is well known, a communication system may utilize multiple communication channels to communicate signals between transmitters and receivers of the system. For example, multiple channels may be used to separate different transmitted data signals from one another, or to provide an increased data rate.

A problem that can arise in multiple channel communication systems relates to crosstalk between the various channels, also referred to as inter-channel crosstalk. For example, digital subscriber line (DSL) broadband access systems typically employ discrete multi-tone (DMT) modulation over twisted-pair copper wires. One of the major impairments in such systems is crosstalk between multiple subscriber lines within the same binder or across binders. Thus, a transmission on one subscriber line may be detected on other subscriber lines, leading to interference that can degrade the throughput performance of the system. More generally, a given "victim" channel may experience crosstalk from multiple "disturber" channels, again leading to undesirable interference.

Dynamic spectrum management (DSM) techniques have been developed in order to combat interference and to maximize the effective throughput and reach of a DSL system. Lower level DSM techniques, commonly referred to as Level 1 and Level 2 techniques, generally adjust the power levels associated with a given subscriber line in an attempt to minimize interference. Level 3 techniques are more sophisticated, and allow active cancellation of inter-channel crosstalk through the use of a precoder. The precoder is typically used to achieve crosstalk cancellation for downstream communications between a central office (CO) and customer premises equipment (CPE). It is also possible to implement crosstalk control for upstream communications from the CPE to the CO, using so-called post-compensation techniques.

One known approach to estimating crosstalk coefficients for downstream power control or crosstalk cancellation in a DSL system involves transmitting distinct pilot signals over respective subscriber lines between a CO and respective CPE of the system. Error feedback from the CPE based on the transmitted pilot signals is then used to estimate crosstalk. Other known approaches involve perturbation of precoder coefficients and feedback of signal-to-noise ratio (SNR) or other interference information.

Crosstalk estimates are commonly utilized in situations in which it is necessary to "join" an additional line to a group of active lines in a DSL system. For example, it may become necessary to activate one or more inactive lines in a synchronization group that already includes multiple active lines. Such joining of an additional line may require that the power control or precoder be adjusted accordingly in order to optimize system performance.

Crosstalk estimates are also used in a variety of other line management applications, including determining whether or not to precode, and setting power levels on victim and disturber lines.

Accordingly, it is important to have accurate crosstalk estimates that can be generated quickly and efficiently.

SUMMARY OF THE INVENTION

The present invention in one or more illustrative embodiments provides techniques for estimation of channel coefficients using a plurality of pilot signals having quasi-orthogonal subpilots. The resulting channel coefficients can be used as crosstalk estimates for controlling crosstalk through power control or preceding, and are also suitable for use in numerous other signal control applications.

In accordance with one aspect of the invention, an access node of a communication system comprises a plurality of transmitters adapted for communication with at least one receiver. The access node may comprise, for example, at least a portion of at least one CO of a DSL communication system. The access node is operative to transmit pilot signals from respective associated ones of the transmitters, to estimate channel coefficients between the transmitters and the receiver, and to utilize the estimated channel coefficients to control at least one data signal sent by at least one of the transmitters. The pilot signals are partitioned into a plurality of sets of pilot signals such that pilot signals from the same set have respective subpilots that are orthogonal to one another and pilot signals from different sets have respective subpilots that are not orthogonal to one another but are instead quasi-orthogonal to one another. The pilot signals are associated with the respective transmitters based on the partitioning of the pilot signals into sets.

For example, a given one of the pilot signals may be of the form $v_j = (v_1, \ldots, v_n)$ and may comprise a plurality of subpilots given by $$v_j^{(\tau m+1,(\tau+1)m)} = (v_{\tau m+1}, v_{\tau m+2}, \ldots, v_{(\tau+1)m}),$$

where n denotes the length in symbols of the given pilot signal and m denotes the length in symbols of each of the subpilots of that pilot signal. The value of m may be given by an integer, and n may be an integer multiple of m, such as n=4m. The pilot signals may be partitioned into pilot sets $S_1, S_2, \ldots, S_{n/m}$ with each pilot set $S_j$ containing m pilot signals.

As a more particular example, in a given one of the illustrative embodiments n=64 and m=16, such that there are 64 mutually orthogonal pilot signals each comprising a 64-tuple, with the 64 pilot signals being partitioned into four pilot sets $S_1, S_2, S_3, S_4$ each of which contains 16 pilot signals. Of course, a wide variety of other values of n and m may be used in other embodiments.

In one or more of the illustrative embodiments, pilot signals from the same pilot set $S_j$ have orthogonal subpilots, such that $$v_t^{(\tau m+1,(\tau+1)m)} * v_r^{(\tau m+1,(\tau+1)m)} = 0, \tau=0, \ldots, n/m-1, \text{ if and only if } v_t, v_r \in S_j,$$

and pilot signals from different pilot signal sets $S_q$ and $S_j$ have quasi-orthogonal subpilots such that $$|v_t^{(\tau m+1,(\tau+1)m)} * v_r^{(\tau m+1,(\tau+1)m)}|^2 = m/n^2, \tau=0, \ldots, n/m-1,$$
if and only if $v_t \in S_q, v_r \in S_j$.

In accordance with another aspect, pilot signals of a first one of the sets are transmitted over respective channels of a first type and pilot signals of a second one of the sets are transmitted over respective channels of a second type. For example, the various sets of pilot signals may be transmitted over respective binders each comprising a plurality of DSL signal lines.

Advantageously, the illustrative embodiments allow crosstalk estimates to be obtained much more quickly than would otherwise be possible, resulting in enhanced speed of operation within the system. For example, a given line can be joined to a group of active lines in substantially less time than would otherwise be required.

These and other features and advantages of the present invention will become more apparent from the accompanying drawings and the following detailed description.

BRIEF DESCRIPTION OF THE DRAWINGS

FIG. 5 shows exemplary sets of pilot signals in which pilot signals in one set have subpilots that are quasi-orthogonal to subpilots of pilot signals in another set.

DETAILED DESCRIPTION OF THE INVENTION

The present invention will be illustrated herein in conjunction with exemplary communication systems and associated techniques for obtaining crosstalk estimates in such systems. The crosstalk estimates may be used in conjunction with joining subscriber lines or other communication channels to a group of active channels in such systems, or for other line management functions. It should be understood, however, that the invention is not limited to use with the particular types of communication systems and channel estimation applications disclosed. The invention can be implemented in a wide variety of other communication systems, using alternative techniques for obtaining channel coefficient estimates, and in numerous alternative applications involving the use of such estimates. For example, although illustrated in the context of DSL systems based on DMT modulation, the disclosed techniques can be adapted in a straightforward manner to a variety of other types of wired or wireless communication systems, including cellular systems, multiple-input multiple-output (MIMO) systems, Wi-Fi or WiMax systems, etc. The techniques are thus applicable to other types of orthogonal frequency division multiplexing (OFDM) systems outside of the DSL context.

Figure 1:
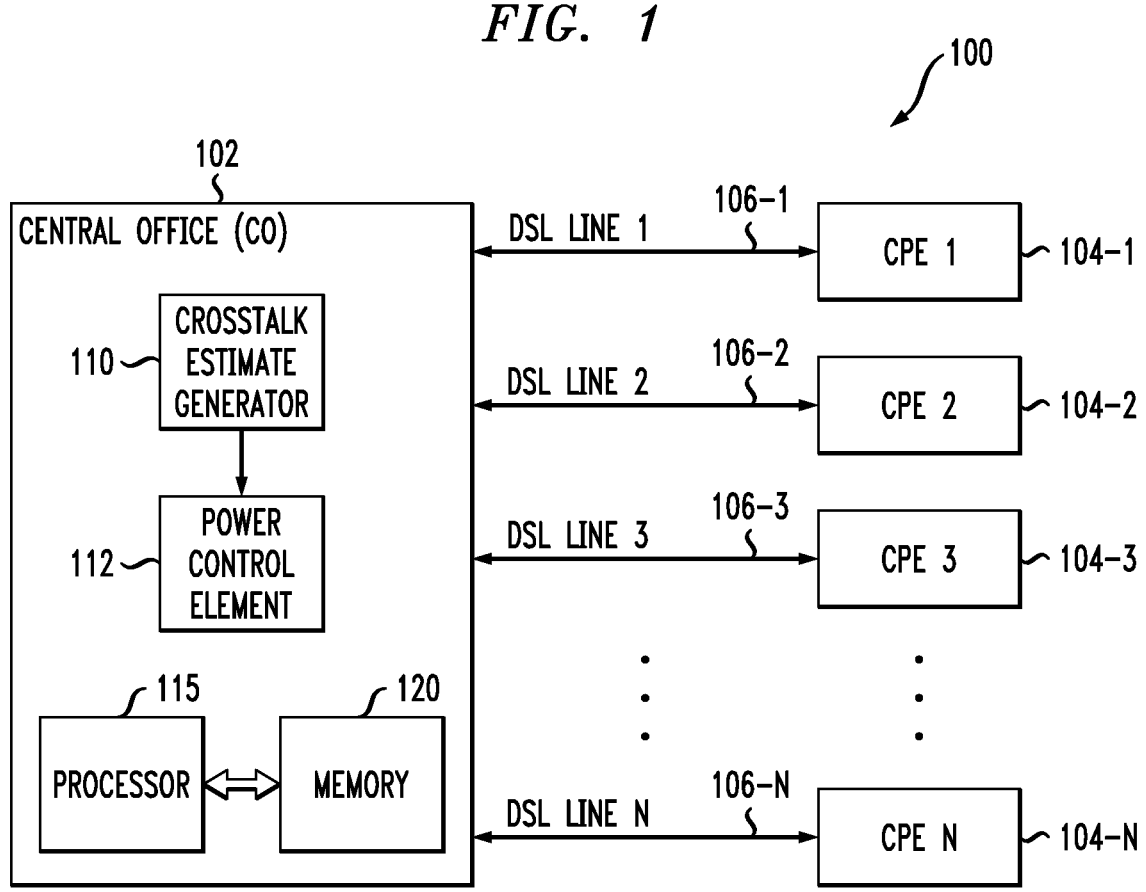
FIG. 1 is a block diagram of a multi-channel communication system in an illustrative embodiment of the invention.

FIG. 1 shows a communication system 100 comprising a central office (CO) 102 and customer premises equipment (CPE) 104. The CPE 104 more particularly comprises N distinct CPE elements that are individually denoted CPE 1, CPE 2, . . . CPE N, and are further identified by respective reference numerals 104-1, 104-2, . . . 104-N as shown. A given CPE element may comprise, by way of example, a modem, a computer, or other type of communication device, or combinations of such devices. The CO 102 is coupled to these CPE elements via respective subscriber lines denoted Line 1, Line 2, . . . Line N, each of which may comprise, for example, a twisted-pair copper wire connection.

In an illustrative embodiment, fewer than all of the N lines 106-1 through 106-N are initially active lines, and at least one of the N lines is a "joining line" that is to be activated and joined to an existing group of active lines. The initially active lines are an example of what is referred to herein as a "group" of active lines. Such a group may be, for example, a synchronization group, which may also be referred to as a preceding group, or any other type of grouping of active lines.

Communications between the CO 102 and the CPE 104 include both downstream and upstream communications for each of the active lines. The downstream direction refers to the direction from CO to CPE, and the upstream direction is the direction from CPE to CO. Although not explicitly shown in FIG. 1, it is assumed without limitation that there is associated with each of the subscriber lines of system 100 a CO transmitter and a CPE receiver for use in communicating in the downstream direction, and a CPE transmitter and a CO receiver for use in communicating in the upstream direction. The corresponding transmitter and receiver circuitry can be implemented in the CO and CPE using well-known conventional techniques, and such techniques will not be described in detail herein.

The CO 102 in the present embodiment comprises a crosstalk estimate generator 110 coupled to a power control element 112. The CO utilizes the crosstalk estimate generator to obtain crosstalk estimates for respective ones of at least a subset of the lines 106. The power control element 112 is used to adjust power levels of signals transmitted over one or more of the lines based on the crosstalk estimates.

It should be understood that power control is just one illustrative example of an application in which the crosstalk estimates generated in CO 102 can be utilized. Other applications include, for example, pre-compensation of downstream signals transmitted from the CO to the CPE, and post-compensation of upstream signals received in the CO from the CPE. Pre-compensation techniques may be implemented using a precoder, an example of which will be described in conjunction with FIG. 2. More generally, crosstalk estimates generated in the manner described herein can be utilized in any application involving coordinating signals sent from multiple transmitters in order to improve system performance by increasing data rates, reducing errors, etc.

The crosstalk estimate generator 110 may be configured to generate crosstalk estimates from error samples, SNR values or other types of measurements fed back to the CO 102 from the CPE 104. Examples of particular techniques for generating crosstalk estimates will be described in detail below.

In other embodiments, crosstalk estimates may be generated outside of the CO 102 and supplied to the CO for further processing. For example, such estimates may be generated in the CPE 104 and returned to the CO for use in power control, preceding, post-compensation or other applications.

A crosstalk estimate is an example of what is more generally referred to herein as a "channel coefficient estimate," an "estimated channel coefficient," or simply a "channel estimate."

The crosstalk estimate generator 110 may incorporate denoising functionality for generating denoised crosstalk estimates. Examples of crosstalk estimate denoising techniques suitable for use with embodiments of the invention are described in U.S. patent application Ser. No. 12/352,896, filed Jan. 13, 2009 and entitled "Power Control Using Denoised Crosstalk Estimates in a Multi-Channel Communication System," which is commonly assigned herewith and incorporated by reference herein. It is to be appreciated, however, that the present invention does not require the use of any particular denoising techniques. Illustrative embodiments to be described herein may incorporate denoising functionality using frequency filters as part of a channel coefficient estimation process.

As will be described in greater detail below, the CO 102 is configured to implement a technique for channel estimation using pilot signals that are partitioned into sets such that pilot signals from the same set have orthogonal subpilots and pilot signals from different sets have quasi-orthogonal subpilots.

In implementing such a technique, the CO transmits the pilot signals over respective ones of the lines 106. Corresponding measurements such as error samples or SNR values are fed back from the CPE to the CO and utilized to generate crosstalk estimates in crosstalk estimate generator 110. The CO then adjusts power levels, performs precoding or otherwise controls data signal transmission based on the crosstalk estimates.

The CO 102 further comprises a processor 115 coupled to a memory 120. The memory may be used to store one or more software programs that are executed by the processor to implement the functionality described herein. For example, functionality associated with crosstalk estimate generator 110 and power control element 112 may be implemented at least in part in the form of such software programs. The memory is an example of what is more generally referred to herein as a computer-readable storage medium that stores executable program code. Other examples of computer-readable storage media may include disks or other types of magnetic or optical media.

The CO 102 or a portion thereof may be viewed as an example of what is more generally referred to herein as an "access node" of a communication system. A single access node may, but need not, comprise multiple COs or portions of one or more COs. Another example of a possible access node is a DSL access multiplexer (DSLAM). Thus, the term "access node" as used herein is intended to be broadly construed so as to encompass, for example, a particular element within a CO, such as a DSLAM, or the CO itself, as well as other types of access point elements in systems that do not include a CO.

In the illustrative embodiment of FIG. 1 the lines 106 are all associated with the same CO 102 which may comprise a single access node. However, in other embodiments, these lines may be distributed across multiple access nodes. Different ones of such multiple access nodes may be from different vendors. For example, it is well known that in conventional systems, several access nodes of distinct vendors can be connected to the same bundle of DSL lines. Under these and other conditions, the various access nodes may have to interact with one another in order to achieve optimal interference cancellation.

The terms "customer premises equipment" or CPE should be construed generally as including other types of user equipment in the context of non-DSL systems.

An implementation of the system 100 of FIG. 1 that includes a precoder will be described below with reference to FIG. 2. Such a precoder is used for active crosstalk cancellation for downstream communications between the CO 102 and CPE 104. However, it should be emphasized that the disclosed techniques can be adapted in a straightforward manner for use in controlling crosstalk for upstream communications. Furthermore, the techniques are applicable to systems involving symmetric communications in which there is no particular defined downstream or upstream direction.

Figure 2:
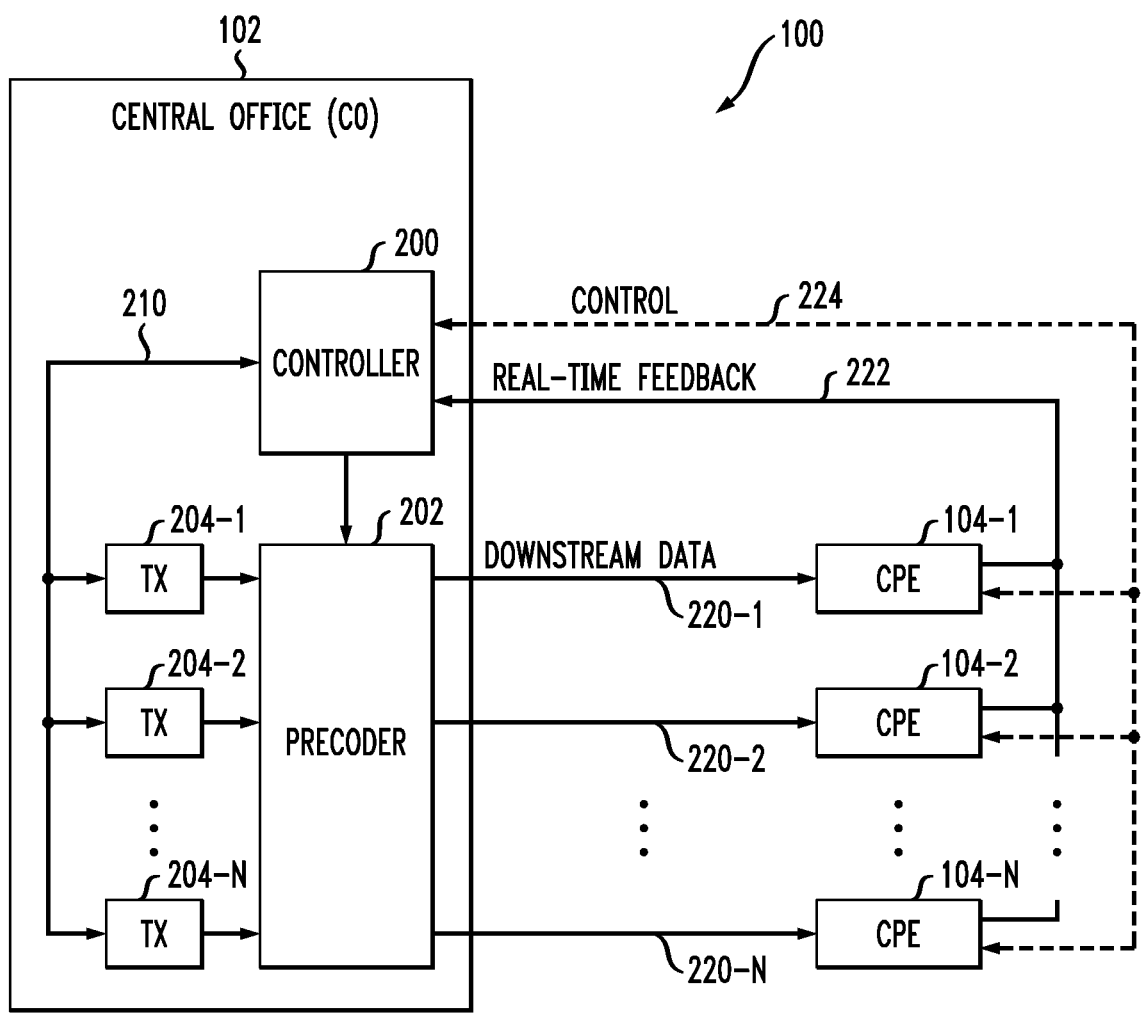
FIG. 2 shows a more detailed view of one possible implementation of the FIG. 1 system.

Referring now to FIG. 2, the CO 102 is shown in this particular implementation as including a controller 200, a precoder 202, and a set of N transmitters denoted 204-1 through 204-N. The controller is coupled to the precoder and the transmitters for controlling the transmission of downstream signals in system 100. The transmitters generate respective streams of DMT symbols that are transmitted over downstream data paths 220-1 through 220-N to respective CPE 104-1 through 104-N. The precoder 202 utilizes crosstalk estimates to adjust the downstream signals prior to transmission in a manner that tends to cancel out the crosstalk introduced in traversing the downstream data paths. Any of a wide variety of known precoding techniques may be used to implement crosstalk cancellation for multiple joining and active lines of the type described herein. Such precoding techniques are well understood by those skilled in the art and therefore will not be described in detail.

The downstream data paths 220 shown in FIG. 2 represent downstream signal paths of the respective DSL lines 106 shown in FIG. 1. The system 100 also includes real-time feedback signal paths 222, which may be upstream signal paths of respective active ones of the DSL lines 106 shown in FIG. 1. It should be noted that a joining line may not have such a real-time feedback signal path until such time as the line is joined to the group and becomes fully active, although in other embodiments a joining line could, for example, be provided with a real-time feedback signal path during an initialization mode. The controller 200 supplies control signals to the CPE via control signal paths 224, which may represent, for example, one or more designated and otherwise conventional control channels within the DSL lines 106.

It should be noted that the controller 200 and precoder 202 may be implemented in whole or in part using the processor 115 of FIG. 1. For example, portions of the functionality associated with the elements 200 and 202 may be implemented in the form of software running on processor 115.

Also, although shown as separate elements in this illustrative embodiment for simplicity and clarity, precoder 202 and transmitters 204 may be combined, such that, for example, the precoding functionality associated with each downstream data path 220 is incorporated into its associated transmitter. The precoder 202 may therefore be viewed as comprising part of the transmitters 204, or may be arranged to precede the transmitters rather than to follow the transmitters as is illustratively shown in the figure.

Each of the CPE 104 may be configurable into multiple modes of operation responsive to control signals supplied by the CO 102 over control signal paths 224, as described in U.S. patent application Ser. No. 12/060,653, filed Apr. 1, 2008 and entitled "Fast Seamless Joining of Channels in a Multi-Channel Communication System," which is commonly assigned herewith and incorporated by reference herein. Such modes of operation may include, for example, a joining mode and a tracking mode. However, this type of multiple mode operation is not a requirement of the present invention.

Illustrative embodiments of the invention will be described herein with reference to DMT tones. However, the term "tone" as used herein is intended to be broadly construed so as to encompass not only DMT tones but also other types of sub-carriers of other multi-carrier communication systems.

It is assumed for illustrative purposes only that downstream transmission over each of the N channels 106 in the system 100 is implemented using DMT modulation with K tones per channel. The nature of the channel from one transmitter to one receiver on a particular tone can be described by a complex coefficient.

Figure 3:
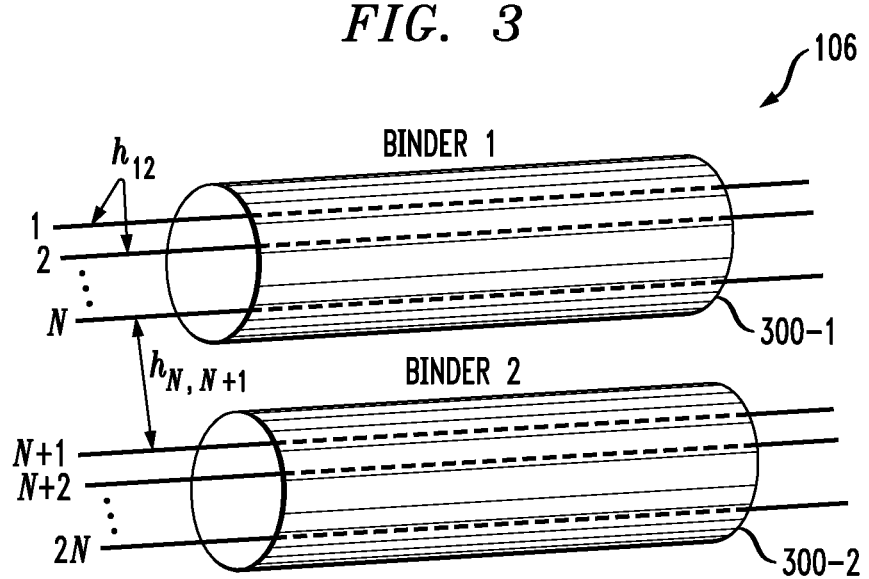
FIG. 3 illustrates signal lines distributed over multiple binders in a multi-channel communication system.

FIG. 3 shows an arrangement in which the N channels 106 of system 100 are within a first binder 300-1 which is adjacent to a second binder 300-2 containing N additional channels, such that the system comprises a total of M=2N channels. The N additional channels in the second binder may be associated with the same CO 102 or access node of system 100 as the N channels 106, or may be associated with a different CO or access node of that system. In any case, it is assumed that all M channels are part of system 100.

Let $h_{ij}$ be the crosstalk channel coefficient between the ith and jth lines, respectively, where i,j=1 ... M. The diagram in FIG. 3 shows one such channel coefficient $h_{12}$ between lines 1 and 2 in the first binder 300-1 and another such channel coefficient $h_{N,N+1}$ between line N in the first binder 300-1 and line N+1 in the second binder 300-2. Channel coefficients between lines in the same binder are typically larger than channel coefficients between lines in different binders.

A conventional approach for estimating the channel coefficients $h_{ij}$ between the lines is to use a set of M orthogonal pilot signals $v_j$, $j=1 \ldots M$, $\|v_j\|=1$, and assign distinct pilot signals to distinct lines. The pilot signals are also referred to herein as simply "pilots." Since the pilots are orthogonal we have $v_j^* v_r = 0$ for any $j \neq r$, where * denotes the transposition and complex conjugation of a complex vector. The fact that the pilots are orthogonal allows one to estimate the channel coefficients with high precision. It is well known that, in order to ensure orthogonality, each of the M pilots must have a length n in symbols which is greater than or equal to M.

The pilot signals can be transmitted in any of a number of different ways. For example, the pilot signals can be sent as part of regularly-occurring sync symbols, which prevents any decrease in data transmission rates. It is also possible to send pilot signals using only a subset of the tones, and to use various interpolation or denoising techniques to obtain estimates of the channel coefficients for all tones. These and numerous other techniques for transmission of pilot signals are known in the art and may be utilized in different embodiments of the present invention.

The signal $y_t$ received over the tth line may be given by $$y_t = h_{t1} v_1 + h_{t2} v_2 + \ldots + h_{tt} v_t + \ldots + h_{t,2N} v_{2N} + w,$$

where w is additive noise. It is typically assumed that the direct channel coefficient $h_{tt}$ is known and therefore we can subtract $h_{tt} v_t$ from $y_t$. In the following description we will further assume that $h_{tt} v_t$ is already subtracted and write $y_t$ in the form $$y_t = h_{t1} v_1 + h_{t2} v_2 + \ldots + h_{t,t-1} v_{t-1} + h_{t,t+1} v_{t+1} + \ldots + h_{t,2N} v_{2N} + w$$

The crosstalk channel coefficient $h_{tj}$ can be estimated, using orthogonally of the pilots, as $$\hat{h}_{tj} = v_j^* y_t / (nP) = h_{tj} + v_j^* w / (nP)$$

where n is the length of each pilot signal and P is the power of each pilot symbol, assuming for simplicity of notation that all n symbols in a given pilot signal are transmitted with the same power P. The other crosstalk channel coefficients $h_{ti}$ do not effect the estimate $\hat{h}_{tj}$, because the pilots are orthogonal and therefore $$v_j^* v_i h_{ti} = 0 \text{ if } i \neq j.$$

The conventional estimation approach described above requires n pilot symbols to be sent and received on each of the M lines where, as noted above, n must be greater than or equal to M to ensure orthogonality of the pilot signals. This is problematic in that the amount of time required to obtain the estimates based on n symbols can be excessive, particularly in applications involving large numbers of lines.

Illustrative embodiments of the present invention overcome this problem of the conventional approach by configuring certain ones of the pilot signals to have quasi-orthogonal subpilots, as will now be described in detail with reference to FIGS. 4 and 5. The use of pilot signals having quasi-orthogonal subpilots allows the crosstalk channel coefficient estimates to be determined much more quickly than would otherwise be possible.

As noted previously, $v_j = (v_1, \ldots, v_n)$ denotes a given pilot signal. This pilot signal may be viewed as comprising a plurality of subpilots given by $$v_j^{(\tau m-1,(\tau-1)m)} = (v_{\tau m+1}, v_{\tau m+2}, \ldots, v_{(\tau+1)m}).$$

Figure 4:
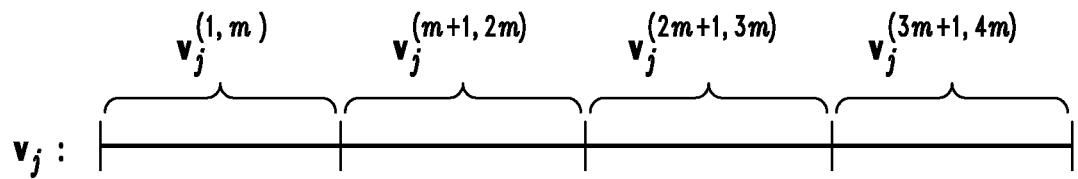
FIG. 4 shows an example of a pilot signal having multiple subpilots in an illustrative embodiment of the invention.

An example of a pilot signal of length n separated into four subpilots each of length m is shown in FIG. 4. Thus, in this example, n=4m. Other embodiments may have different relationships between n and m. For example, n may be equal to 2m, 3m, 5m, 6m, and so on.

One or more of the illustrative embodiments use mutually orthogonal pilots $v_j$, $v_j^* v_r = 0$, with the special feature that for some indices q and k the subpilots $v_q^{(\tau m+1,(\tau+1)m)}$ and $v_k^{(\tau m+1,(\tau+1)m)}$ are orthogonal, that is $v_q^{(\tau m+1,(\tau+1)m)*} v_k^{(\tau m+1,(\tau+1)m)} = 0$, $\tau = 0, \ldots, n/m-1$, while for other indices j and r the subpilots are quasi-orthogonal in that their inner product is $$|v_j^{(\tau m+1,(\tau+1)m)*} v_r^{(\tau m+1,(\tau+1)m)}|^2 = m/n^2, \tau = 0, \ldots, n/m-1,$$

which is a value that is not exactly zero, but quite close to zero. It is to be appreciated that this particular measure of quasi-orthogonality is not a requirement of the invention. Numerous alternative measures may be used to determine quasi-orthogonality of subpilots as disclosed herein. The term "quasi-orthogonal" as used herein is therefore intended to refer to subpilots that are not orthogonal to one another but have an inner product or other orthogonality measure that is close to zero.

The quasi-orthogonally of the subpilots allows one to obtain estimates of channel coefficients immediately after receiving subpilots $v_j^{(1,m)}$, $v_j^{(m+1,2m)}$, $v_j^{(2m+1,3m)} \ldots$, thereby significantly reducing the amount of time required for coefficient estimation. Indeed, after receiving each new subpilot, the coefficient estimate can be updated. The pilot signals still have the same length n and continue to be mutually orthogonal, but exhibit the additional property that their subpilots are either orthogonal or quasi-orthogonal, allowing coefficient estimation with much less delay.

More specifically, the set of pilot signals in a given illustrative embodiment may have the following properties:

1. All of the pilots are n-tuples, where n is a power of a prime number, that is $n = p^l$ where p is a prime number and l is a positive integer, for example, n can be a power of two, $n = 2^l$ and $r < l$. The total number of pilots is n. All of the pilots are mutually orthogonal, that is $v_j^* v_r = 0$.

2. For some predesigned $m = p^r (r < l)$, the pilots can be portioned into pilot sets $S_1, S_2, \ldots, S_{p^{l-r}}$, where each pilot set $S_j$ contains $p^r$ pilots. Pilots from the same pilot set $S_j$ have orthogonal subpilots, that is $$v_t^{(\tau m+1,(\tau+1)m)*} v_r^{(\tau m+1,(\tau+1)m)} = 0, \tau = 0, \ldots, n/m-1, \text{ if and only if } v_t, v_r \in S_j, \quad (1)$$

and pilots from different pilot sets have quasi-orthogonal subpilots, that is $$|v_t^{(\tau m+1,(\tau+1)m)*} v_r^{(\tau m+1,(\tau+1)m)}|^2 = m/n^2, \tau = 0, \ldots, n/m-1,$$
$$\text{if and only if } v_t \in S_q, v_r \in S_j. \quad (2)$$

Again, the particular measure of quasi-orthogonality used in (2) above is presented by way of example only, and other measures may be used in other embodiments.

FIG. 5 illustrates portions of two pilot sets in an exemplary partitioning of the type described above. In this example, n=64 and m=16, such that there are 64 mutually orthogonal pilots and each pilot is a 64-tuple. These 64 pilots are partitioned into four pilot sets $S_1, S_2, S_3, S_4$ each of which contains 16 pilots. Pilots from the same pilot set have subpilots that are orthogonal, while pilots from different pilot sets have subpilots that are quasi-orthogonal. Thus, if $v_t \in S_q$, $v_r \in S_j$, $q \neq j$, then $|v_t^{(1,16)*} v_r^{(1,16)}|^2 = 1/256$. The figure shows the first three pilots in each the pilot sets $S_1, S_2$ of this example case of n=64 and m=16. It is to be appreciated that the particular values of n and m used in this example are illustrative only, and other embodiments may utilize different partitioning arrangements.

As indicated previously, crosstalk channel coefficients can be estimated in a particularly efficient manner using pilot signals of the type described above. A more detailed example of this estimation process will now be described.

Assume that there are k active lines where k<n, and that estimates $\hat{h}_{ij}$ of the crosstalk channel coefficients $h_{ij}$ between the active lines have been obtained with the help of their respective full length orthogonal pilots. For efficient precoding, estimation errors should not exceed a designated amount, which we assume to be about 0.5%. Hence we assume that $\hat{h}_{ij}$ is different from $h_{ij}$ by not more than about 0.5%.

Now assume that a new line, denoted line t, joins the existing group of k active lines. The crosstalk channel coefficient between a given active line, say line 1, and the joining line t can be obtained in the following way. The signal received over line 1 is $$y_1^{(1,m)} = h_{12}v_2^{(1,m)} + \ldots + h_{1k}v_k^{(1,m)} + h_{1t}v_t^{(1,m)} + w.$$

Using known estimates $\hat{h}_{ij}$ we can compute $$z_1^{(1,m)} = (h_{12} - \hat{h}_{12})v_2^{(1,m)} + \ldots + (h_{1k} - \hat{h}_{1k})v_k^{(1,m)} + h_{1t}v_t^{(1,m)} + w$$

and the estimate $\hat{h}_{1t}$ can be obtained as $$\hat{h}_{1t} = v_t^{(1,m)*}z_1^{(1,m)}/(n/mP) = (h_{12} - \hat{h}_{12})v_t^{(1,m)*}v_2^{(1,m)}/(n/mP) + \ldots + (h_{1k} - \hat{h}_{1k})v_t^{(1,m)*}v_k^{(1,m)}/(n/mP) + h_{1t} + v_t^{(1,m)*}w/(n/mP)$$

For those values of j for which $v_t, v_j$ are from the same pilot set we will have $$v_t^{(1,m)*}v_j^{(1,m)} = 0$$

and therefore there is no contribution to estimation error at all for such values. For other values of j we have $$|v_t^{(1,m)*}v_j^{(1,m)}|^2 = m/n^2 \quad (3)$$

Since the magnitude of $(h_{1j} - \hat{h}_{1j})$ is already small, and taking into account (3), we conclude that the magnitude of $(h_{1j} - \hat{h}_{1j})v_t^{(1,m)*}v_j^{(1,m)}$ makes only a negligible contribution to the estimation error.

Thus, we obtain the estimate $\hat{h}_{1t}$ after m rather than n pilot symbols, and can use that estimate for interference cancellation precoding in active line 1. Other independent estimates of $\hat{h}_{1t}$ can be obtained in a similar way with the help of vector $z_1^{(\tau m+1, (\tau+1)m)}$ and subpilot $v_t^{(\tau m+1, (\tau+1)m)}$ for any $\tau = 1, \ldots, n/m-1$. These independent estimates can be used to gradually improve the estimate of $\hat{h}_{1t}$. The full precision estimate of $h_{1t}$ will be obtained later after all n pilot symbols have been processed.

The result is a significant speed up in the joining process. For example, the speed up can be by a factor of 2, 4, 8, or an even larger number, depending on the values of the parameters m and n. The power of the joining line can be incremented at the end of each m symbol interval.

The exemplary process described above can be generally applied to any system in which it is desirable to decrease the amount of time required to obtain crosstalk channel estimates. However, it is particularly advantageous in arrangements such as that shown in FIG. 3 involving lines distributed across multiple binders. As mentioned previously, the crosstalk channel coefficients between lines in different binders are often significantly smaller than between lines from the same binder. Typically the coefficients between lines from different binders are 10 times smaller, and more typically 100 or even 1000 times smaller, than the coefficients between lines from the same binder.

In this type of multiple binder arrangement, an embodiment of the invention uses a distinct pilot set $S_j$ for each binder. If lines t and j are from different binders then the coefficient $h_{tj}$ is very small and the magnitude of $(h_{tj} - \hat{h}_{tj})$ is even smaller. Since pilots from different pilot sets in this embodiment have quasi-orthogonal subpilots, the magnitude $(h_{1j} - \hat{h}_{1j})v_t^{(1,m)*}v_j^{(1,m)}$ will be very small and therefore there is almost no contribution to estimation error. If t and j are from the same binder then $(h_{tj} - \hat{h}_{tj})$ can be larger, but since for these lines we use pilots from the same pilot set we have $v_t^{(1,m)*}v_j^{(1,m)} = 0$ and therefore there is no contribution to the estimation error at all.

This can be further illustrated with the following example. Assume with reference to FIG. 3 that the first binder 300-1 contains lines 1, 2, ..., 8 and the second binder 300-2 contains lines 9, 10, ..., 16, with all lines being of length 400 meters. Further assume that line 8 is joining a group of active lines that includes line 1 and we are interested in estimating the channel coefficient $h_{18}$. Let m=16 and n=64 and assume we use the first pilot set $S_1$ for lines from the first binder and the second pilot set $S_2$ for lines from the second binder.

Exemplary measured values for intrabinder crosstalk channel coefficients $h_{12}, \ldots, h_{18}$ associated with the first binder 300-1 are as follows:

0.0007842 0.0002876 0.0000812 0.0007426 0.0000918 0.0001551 0.0001792 and measured values for interbinder crosstalk channel coefficients $h_{19}, \ldots, h_{1,16}$, where line 1 is from the first binder 300-1 and lines 9, ..., 16 are from the second binder 300-2, are as follows:

0.00000173 0.00000748 0.00000364 0.00000155 0.00001032 0.00000417 0.00001018 0.00000779

It is apparent from these measured values that the interbinder coefficients are significantly smaller than the intrabinder coefficients. Hence the magnitudes of $(h_{19} - \hat{h}_{19}), \ldots, (h_{1,16} - \hat{h}_{1,16})$, are very small. For this reason the magnitudes of $(h_{19} - \hat{h}_{19})v_1^{(1,m)*}v_9^{(1,m)}, \ldots, (h_{1,16} - \hat{h}_{1,16})v_1^{(1,m)*}v_{16}^{(1,m)}$, will be very small even though subpilots from the first and second pilot sets are only quasi-orthogonal. The magnitudes of $(h_{12} - \hat{h}_{12}), \ldots, (h_{17} - \hat{h}_{17})$, will typically be larger, but since the pilots from the same pilot set $S_1$ are used for the first binder 300-1 comprising lines 1, 2, ..., 8 we will have $(h_{12} - \hat{h}_{12})v_1^{(1,m)*}v_2^{(1,m)} = 0, \ldots, (h_{17} - \hat{h}_{17})v_1^{(1,m)*}v_8^{(1,m)} = 0$, so they will not contribute to the estimation error at all.

This numerical example based on actual measured crosstalk channel coefficients illustrates that we can estimate coefficients $h_{ij}$ very accurately, with an estimation error not exceeding 0.001%, in only a quarter of the time required in the typical conventional approach previously described. Moreover, even if we assume that only estimates of the crosstalk channel coefficients between lines in the same binder are available to us, that is, we have estimates of $h_{12}, \ldots, h_{17}$ and we do not have estimates of $h_{18}, \ldots, h_{1,16}$, nevertheless we still can estimate $h_{18}$ precisely enough to start interference cancellation precoding. Again, this is because the coefficients $h_{19}, \ldots, h_{1,16}$ are small and therefore the magnitudes of $h_{19}v_1^{(1,m)*}v_9^{(1,m)}, \ldots, h_{1,16}v_1^{(1,m)*}v_{16}^{(1,m)}$, are small enough for obtaining a good estimate of $h_{18}$.

Additional details regarding the construction of pilot signals having quasi-orthogonal subpilots will now be described. It should be noted that the construction techniques described below and the resulting pilot sets are exemplary only, and other embodiments of the invention may use different types of pilot sets with quasi-orthogonal subpilots as well as different techniques to generate such pilot sets. Also, the notation used in the description to follow differs from that used elsewhere herein, and thus certain variables may have a different meaning below than in the context of other embodiments. In the following description, the construction of the pilot signals is based on the representation theory of finite groups. This description will make use of definitions and examples as indicated.

Definition 1 The Galois field $F_p$, p is a prime, is the set {0, 1, ..., p−1} with summation and multiplication conducted modulo p. For example, if p=3 then (2+2)mod 3=1. For additional details see R. Lidl and H. Niederreiter, "Finite Fields," Addison-Wesley Publishing Company, 1983, which is incorporated by reference herein.

Definition 2 A set C of distinct vectors $c_1, \ldots, c_{p^r}$ is called a linear space of dimension r over $F_p$ if all elements of all vectors $c_j$ are from $F_p$ and for any $1 \leq j, t \leq p^r$, and $\alpha, \beta \in F_p$ we have $$\alpha \cdot c_j + \beta \cdot c_t \in C,$$

where all summations and multiplications are conducted by modulo p.

Note that any vector space contains the all-zero vectors (0,0, ..., 0).

Example 1

Let p=2 then $$C = \{(0,0,0,0),(0,0,1,1),(1,1,0,0),(1,1,1,1)\},$$

is a linear space of dimension 2 over $F_2$. Let p=3 then $$C = \{(0,0,0,0),(0,0,1,1),(0,0,2,2),(1,1,1,0),(2,2,2,0),(1,1,2,1),(1,1,0,2),(2,2,1,2),(2,2,0,1)\},$$

is a linear space of dimension 2 over $F_3$.

Definition 3 The component-wise product * between vectors $c = (c_1, \ldots, c_t)$ and $g = (g_1, \ldots, g_t)$ is equal to the vector $h = (h_1, \ldots, h_t)$ defined by $$h_j = c_j g_j.$$

Definition 4 The inner product between vectors $c = (c_1, \ldots, c_t)$ and $g = (g_1, \ldots, g_t)$ over $F_p$ is equal to $$c_1 g_1 + \ldots + c_t g_t.$$

The inner product between complex vectors $c = (c_1, \ldots, c_t)$ and $g = (g_1, \ldots, g_t)$ is equal to $c_1^* g_1 + \ldots + c_t^* g_t$.

Definition 5 The tensor product of two matrices A and B, with entries $a_{ij}$ and $b_{ij}$ respectively, is defined by $$A \otimes B = [a_{ij} B].$$

Definition 6 A Hadamard matrix $H_m$ of size m is a matrix with entries ±1 such that the inner product between any two rows of $H_m$ is equal to zero.

Example 2

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Construction of orthogonal pilots with quasi-orthogonal subpilots can be done as described below.

1. Form quasi-orthogonal m-tuples (vectors) $x_j$, j=1, ..., n/m, (m=$p^r$), that is $$|x_i^* x_j|^2 = m/n^2.$$

We assume here that $x_j$ are normalized such that $\|x_j\|^2 = m/n$. We explain later how to form the vectors $x_j$. For the moment we assume that we already have these vectors.

2. Form m×m matrices $A_j$, j=1, ..., n/m, as follows. Let $V_m$ be a unitary matrix of size m. The tth row $a_t$ of $A_j$ is obtained as the component-wise product of vectors $x_j$ and the tth row $v_t$ of $V_m$, that is $$a_t = x_j * v_t.$$

In the case of using a general unitary matrix the components of the obtained pilots will be arbitrary complex numbers. In order to obtain pilots whose components belong to the set {1,−1,i,−i} if p=2 or have the form $e^{j \cdot i 2\pi/p}$ if p≥3 we use a Hadamard matrix $H_m$ as the matrix $V_m$ if p=2. If p≥3 we use as the matrix $V_m$ the tensor product $$V_m = \underbrace{F_p \otimes \ldots \otimes F_p}_{r \, times},$$

where $F_p$ is either the matrix of the discrete Fourier transform or the inverse discrete Fourier transform.

3. Let $U_{n/m}$ be a unitary matrix of size n/m. Form m×n matrices $B_j$, j=1, ..., n/m, as the tensor product of the j-th row of $U_{n/m}$ and the matrix $A_j$, that is $$B_j = u_j \otimes A_j.$$

Again it will be convenient to use a Hadamard matrix or the discrete Fourier transform matrix as the unitary matrix $U_{n/m}$.

4. Use the rows of the matrices $B_j$ as pilots with quasi-orthogonal subpilots.

Example 3

Let n=16, m=4. To form matrices $A_j$ we choose $a_1 = \frac{1}{4} \cdot (1,1,1,1)$, $a_2 = \frac{1}{4} \cdot (1,-i,-i,-1)$, $a_3 = \frac{1}{4} \cdot (1,-i,1,i)$, and $a_4 = \frac{1}{4} \cdot (1,1,-i,i)$. In this example m=n/m=4. We choose $$V_4 = U_4 = H_4 = \begin{bmatrix} h_1 \\ h_2 \\ h_3 \\ h_4 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Then, for example, the matrix $A_2$ has the form $$\begin{bmatrix} 1 & -i & -i & -1 \\ 1 & i & -i & 1 \\ 1 & -i & i & 1 \\ 1 & i & i & -1 \end{bmatrix}.$$

The 4×16 matrices $B_j$ have the following form $$B_1 = h_1 \otimes A_1 = [A_1, A_1, A_1, A_1],$$

$$B_2 = h_2 \otimes A_2 = [A_2, -A_2, A_2, -A_2],$$

$$B_3 = h_3 \otimes A_3 = [A_3, A_3, -A_3, -A_3],$$

$$B_4 = h_4 \otimes A_4 = [A_4, -A_4, -A_4, A_4].$$

It is a straightforward matter to check that the obtained pilots, that is, the rows of $B_j$, have quasi-orthogonal subpilots.

One can also prove the following:
the rows of any $A_j$ are orthogonal;
a row of $A_j$ and a row of $A_t$, t≠j, are quasi-orthogonal;

subpilots of any two pilots given by respective rows of $B_j$ and $B_i$ are also quasi-orthogonal; that is if $v_r$ is a pilot given by a row of $B_j$ and $v_l$ is a pilot given by a row of $B_t$, then one can prove that $$|v_l^{(\tau m+1, (\tau+1)m)} * v_r^{(\tau m+1, (\tau+1)m)}|^2 = m/n^2, \tau=0,\ldots,n/m-1,$$

the full length pilots given by respective rows of $B_j$ are orthogonal, that is $$v_l^{(\tau m+1, (\tau+1)m)} * v_r^{(\tau m+1, (\tau+1)m)} = 0, \tau=0,\ldots,n/m-1, \text{ if } v_l, v_r \in B_j$$

The manner in which quasi-orthogonal vectors $a_j$ are constructed will now be described in greater detail. First we consider the case $p=2$ and $m=2^r$. Let $$I_2 = \begin{bmatrix} 1 & 0 \\ 0 & 1 \end{bmatrix}, X = \begin{bmatrix} 0 & 1 \\ 1 & 0 \end{bmatrix}, Z = \begin{bmatrix} 1 & 0 \\ 0 & -1 \end{bmatrix}, Y = \begin{bmatrix} 0 & i \\ -i & 0 \end{bmatrix}.$$

Let $y=(y_1,\ldots,y_{2r})$, $y_j=0,1$, be a binary $2r$-tuple, and $z=(z_1,\ldots,z_{2r})$, $z_j=0,1$, be another binary $2r$-tuple. We define the symplectic inner product between $y$ and $z$ by $$y \cdot z = (y_1 z_{r+1} + y_2 z_{r+2} + \ldots + y_{r+1} z_1 + y_{r+2} z_2 + \ldots + y_{2r} z_1) \mod 2.$$

For any binary $2r$-tuple $y=(y_1,\ldots,y_{2r})$ we define $2^r \times 2^r$ matrix $$E = e_1 \otimes e_2 \otimes \ldots \otimes e_r,$$

where $$e_j = \begin{cases} I_2, & y_j = 0, y_{r+j} = 0 \\ X, & y_j = 1, y_{r+j} = 0 \\ Z, & y_j = 0, y_{r+j} = 1 \\ Y, & y_j = 1, y_{r+j} = 1 \end{cases}$$

Example 4

Let $r=2$ and $=(1,1,0,1)$. Then $$E = X \otimes Y = \begin{bmatrix} 0 & 0 & 0 & i \\ 0 & 0 & -i & 0 \\ 0 & i & 0 & 0 \\ -i & 0 & 0 & 0 \end{bmatrix}.$$

Let $C=\{c_1,\ldots,c_{2^r}\}$ be a linear space of dimension $r$ over $F_2$ and let $$c_j \cdot c_t = 0 \text{ for any } j \neq t.$$

Definition 7 We will say that C is a self-orthogonal linear space of dimension $r$.

For each $c_j$ from C form $E_{c_j}$. Form constants $q_1,\ldots,q_{2^r} \in \{-1,1\}$ as follows. Without loss of generality we assume that $c_1=(0,0,\ldots,0)$.

1. Assign $q_1=1$ and form $G_{c_1}=q_1 E_{c_1}$ and $S=\{G_{c_1}\}$; $R=\{c_1\}$
2. Repeat steps 3-9 $r-1$ times
3. Take any $c_t \in C$ such that $c_t \notin R$ and $c_t \neq (0,0,\ldots,0)$;
4. Assign $q_t=1$, $G_{c_t}=q_t E_{c_t}$;
5. Form $T=\{G_{c_t}\}$; $Q=R$
6. For all $c_j \in Q$ do steps 7 and 8
7. If $$G_{c_j} G_{c_t} = E_{(c_j+c_t) \mod 2}$$

then assign $q_{(c_j+c_t) \mod 2}=1$ otherwise assign $q_{(c_j+c_t) \mod 2}=-1$;
8. Form $$G_{(c_j+c_t) \mod 2} = q_{(c_j+c_t) \mod 2} E_{(c_j+c_t) \mod 2},$$

and form $T=T \cup G_{(c_j+c_t) \mod 2}$; and $Q=Q \cup (c_j+c_t) \mod 2$
9. Form $R=Q \cup R$ and $S=S \cup T$.

This choice of $q_1,\ldots,q_{2^r} \in \{-1,1\}$ guarantees that matrices $G_{c_j}=q_j E_{c_j}$ form an Abelian group, that is $$G_{c_j} G_{c_t} = G_{(c_j+c_t) \mod 2}$$

Form the matrix $P_C$ as follows $$P_C = \frac{1}{2^r}(G_{c_1} + \ldots + G_{c_{2^r}})$$

One can prove that $P_C$ has one eigenvalue equal to 1 and all other eigenvalues equal to 0s.

Form quasi-orthogonal vectors $a_j$ according to the following steps.

1. Take self-orthogonal spaces $C_1,\ldots,C_{2^r}$ of dimension $r$ such that the only common vector between $C_j$ and $C_t$ is the all-zero vector $(0,\ldots,0)$. For small $r$, which are important for practical applications, $C_1,\ldots,C_{2^r}$ can be easily found with the help of a computer search.

2. For $j=1,\ldots,2^r$ find the eigenvectors $a_j$ corresponding to the eigenvalue 1 of $P_{C_j}$. One can prove that the vectors $a_j$, $j=1,\ldots,2^r$, are quasi-orthogonal.

Example 5

Let $r=2$ and $$C_1=\{(0,0,0,0),(0,1,0,0),(1,0,0,0),(1,1,0,0)\},$$

$$C_2=\{(0,0,0,0),(0,1,0,1),(1,0,1,0),(1,1,1,1)\},$$

$$C_3=\{(0,0,0,0),(0,1,1,1),(1,1,0,1),(1,1,1,0)\},$$

$$C_4=\{(0,0,0,0),(0,1,1,0),(1,0,1,1),(1,1,0,1)\}.$$

It is straightforward to check that these $C_j$ satisfy the needed requirements. The constants $q_j$ are $q_1=1$, $q_2=1$, $q_3=1$, $q_4=1$. Using these $C_j$ one can construct corresponding matrices $P_{C_j}$. For example $$P_{C_1} = 1/4 \begin{bmatrix} 1 & 1 & 1 & 1 \\ 1 & 1 & 1 & 1 \\ 1 & 1 & 1 & 1 \\ 1 & 1 & 1 & 1 \end{bmatrix}.$$

It can also be seen that $a_1 = \frac{1}{4} \cdot (1,1,1,1)$ is the eigenvector of $P_{C_1}$ with the eigenvalue 1. Eigenvectors with eigenvalues 1 of other $P_{C_j}$ are $$a_2 = \frac{1}{4} \cdot (1,-i,-i,1), a_3 = \frac{1}{4} \cdot (1,-i,1,i),$$

$$a_4 = \frac{1}{4} \cdot (1,1,-i,i).$$

Let us now consider the case $p>2$ and $m=p^r$. Let $$\delta_{l,j} = \begin{cases} 1, & l=j \\ 0, & l \neq j. \end{cases}$$

Let us define $p \times p$ matrices T and R by their entries $$T_{lj} = \delta_{l,j-1, \mod p}, \text{ and } R_{lj} = \omega^l \delta_{l,j},$$

where $\omega = e^{i 2\pi/p}$ and $0 \leq l, j \leq p-1$.

Example 6

$$T = \begin{bmatrix} 0 & 1 & 0 \\ 0 & 0 & 1 \\ 1 & 0 & 0 \end{bmatrix}, R = \begin{bmatrix} 1 & 0 & 0 \\ 0 & \omega & 0 \\ 0 & 0 & \omega^2 \end{bmatrix}.$$

For any vector $y = (y_1, \ldots, y_{2r})$ with entries $y_j \in F_p$ we define $$E = T^{y_1} R^{y_r} \otimes T^{y_2} R^{y_{r+1}} \otimes \ldots T^{y_r} R^{y_{2r}}.$$

Let $y = (y_1, \ldots, y_{2r})$, $y_j \in F_p$, and $z = (z_1, \ldots, z_{2r})$, $z_j \in F_p$. We define the symplectic inner product between y and z by $$y \cdot z = (y_1 z_{r+1} + y_2 z_{r+2} + \ldots + y_r z_{2r} - y_{r+1} z_1 - y_{r+2} z_2 - \ldots - y_{2r} z_1) \bmod p.$$

All other steps are similar to the case p=2 with the following exceptions:

- all $2^r$ are replaced with $p^r$;
- all operations are conducted by modulo p;
- constants $q_1, \ldots, q_{p^r}$ belong to the set $\{\omega^0, \omega, \ldots, \omega^{p-1}\}$.

Again, the pilot signal construction techniques described above are exemplary only, and alternative techniques may be used to generate pilot signal sets such that pilot signals from the same set have orthogonal subpilots and pilot signals from different sets have quasi-orthogonal subpilots.

Advantageously, use of the techniques described herein allows a significantly speed up in the process of estimating crosstalk channel coefficients without sacrificing the precision of the estimates. Estimates obtained in this manner facilitate the process of safe line joining without creating significant interference to other lines. For example, in the DSL context the channel coefficient estimates will allow one to efficiently precode active DSL lines against interference created by a joining line with only a short delay, which can help to prevent the active lines from dropping. The disclosed techniques for estimating channel coefficients based on pilot signals having quasi-orthogonal subpilots are also useful in a wide variety of other data signal control processes.

As mentioned above, the illustrative embodiments utilize an error feedback approach to channel coefficient estimation. However, the techniques of the invention can be adapted in a straightforward manner to other contexts, such as crosstalk estimation by SNR feedback. It should also be noted that the invention can be implemented in embodiments that do not utilize error feedback or SNR feedback.

In the illustrative embodiments, the length of the pilot signals is selected as greater than or equal to the number of channels in order to maintain orthogonality between the pilot signals. However, other embodiments of the invention may be configured to utilize pilot signals having lengths that are less than the number of channels using techniques disclosed in U.S. patent application Ser. No. 12/370,148, filed Feb. 12, 2009 and entitled "Simultaneous Estimation of Multiple Channel Coefficients Using a Common Probing Sequence," which is incorporated by reference herein. Such techniques allow a common pilot sequence to be shared by multiple transmitters.

Embodiments of the present invention may be implemented at least in part in the form of one or more software programs that are stored in a memory or other processor-readable medium of CO 102 or CPE 104 of system 100. Such programs may be retrieved and executed by a processor in the CO or CPE. The controller 200 may be viewed as an example of such a processor. Of course, numerous alternative arrangements of hardware, software or firmware in any combination may be utilized in implementing these and other systems elements in accordance with the invention.

It should again be emphasized that the embodiments described above are presented by way of illustrative example only. Other embodiments may use different communication system configurations, CO and CPE configurations, communication channels, pilot signal set partitioning arrangements, measures of quasi-orthogonality, and crosstalk estimate generation and crosstalk control process steps, depending on the needs of the particular communication application. Alternative embodiments may therefore utilize the techniques described herein in other contexts in which it is desirable to quickly obtain crosstalk coefficients for at least a subset of tones.

In the illustrative embodiment of FIG. 2, it is assumed that all of the lines are subject to precoding. However, other embodiments need not be so configured, and one or more lines may not have associated precoding. In an arrangement of this type, the disclosed techniques may be used to measure how much crosstalk would be caused in non-precoded active lines, and a determination may then be made to reduce the power level on certain tones that are giving rise to this interference.

It should also be noted that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method comprising the steps of:
transmitting pilot signals from respective associated ones of a plurality of transmitters;
estimating channel coefficients between the transmitters and at least one receiver; and
utilizing the estimated channel coefficients to control at least one data signal sent by at least one of the transmitters;
wherein the pilot signals are partitioned into a plurality of sets of pilot signals such that pilot signals from the same set have respective subpilots that are orthogonal to one another and pilot signals from different sets have respective subpilots that are not orthogonal to one another but are instead quasi-orthogonal to one another; and
wherein the pilot signals are associated with the respective transmitters based on said partitioning of the pilot signals into sets.

2. The method of claim 1 wherein a given one of the pilot signals is of the form $v_j = (v_1, \ldots, v_n)$ and comprises a plurality of subpilots given by $$v_j^{(\tau m+1,(\tau+1)m)} = v_{\tau m+1}, v_{\tau m+2}, \ldots, v_{(\tau+1)m},$$
$$\tau = 0, \ldots, n/m-1,$$

where n denotes the length in symbols of the given pilot signal and m denotes the length in symbols of each of the subpilots of that pilot signal.

3. The method of claim 2 wherein n is an integer multiple of m.

4. The method of claim 2 wherein $m = p^r$ where p is a prime number and r is an integer.

5. The method of claim 2 wherein the pilot signals are partitioned into pilot sets $S_1, S_2, \ldots, S_{n/m}$, and each pilot set $S_j$ contains m pilot signals.

6. The method of claim 2 wherein the pilot signals comprise n mutually orthogonal pilot signals each comprising an n-tuple.

7. The method of claim 5 wherein pilot signals from the same pilot set $S_j$ have orthogonal subpilots, such that $$v_t^{(\tau+1,(\tau+1)m)} * v_r^{(\tau+1,(\tau+1)m)} = 0, \tau=0, \ldots, n/m-1, \text{ if and only if } v_t, v_r \in S_j.$$

8. The method of claim 5 wherein pilot signals from different pilot signal sets $S_q$ and $S_j$ have quasi-orthogonal subpilots such that $$|v_t^{(\tau+1,(\tau+1)m)} * v_r^{(\tau+1,(\tau+1)m)}|^2 = m/n^2, \tau=0, \ldots, n/m-1, \text{ if and only if } v_t \in S_q, V_r \in S_j.$$

9. The method of claim 1 wherein the transmitting step comprises transmitting the pilot signals of a first one of the sets over respective channels of a first type and transmitting the pilot signals of a second one of the sets over respective channels of a second type.

10. The method of claim 9 wherein the channels of the first type comprise respective lines of a first binder and the channels of the second type comprise respective lines of a second binder.

11. The method of claim 1 wherein the step of utilizing the estimated channel coefficients to control at least one data signal sent by at least one of the transmitters comprises the step of adjusting precoder coefficients applied to data signals sent by the transmitters to respective receivers over respective channels of the system based on the estimated channel coefficients in order to control crosstalk between said channels.

12. The method of claim 1 further comprising the step of utilizing the estimated channel coefficients to perform post-compensation of one or more received signals.

13. The method of claim 1 wherein the step of estimating channel coefficients comprises processing error samples fed back from the receiver based on the transmitted pilot signals.

14. A non-transitory computer-readable storage medium having embodied therein executable program code that when executed by a processor of an access node of the system causes the access node to perform the steps of the method of claim 1.

15. An apparatus comprising:
an access node comprising a plurality of transmitters adapted for communication with at least one receiver;
the access node being configured to transmit pilot signals from respective associated ones of the transmitters, to estimate channel coefficients between the transmitters and the receiver, and to utilize the estimated channel coefficients to control at least one data signal sent by at least one of the transmitters;
wherein the pilot signals are partitioned into a plurality of sets of pilot signals such that pilot signals from the same set have respective subpilots that are orthogonal to one another and pilot signals from different sets have respective subpilots that are not orthogonal to one another but are instead quasi-orthogonal to one another; and
wherein the pilot signals are associated with the respective transmitters based on said partitioning of the pilot signals into sets.

16. The apparatus of claim 15 wherein a given one of the pilot signals is of the form $v_j=(v_1, \ldots, v_n)$ and comprises a plurality of subpilots given by $$v_j^{(\tau m+1,(\tau+1)m)} = v_{\tau m+1}, v_{\tau m+2}, \ldots, v_{(\tau+1)m},$$
$$\tau=0, \ldots, n/m-1,$$

where n denotes the length in symbols of the given pilot signal and m denotes the length in symbols of each of the subpilots of that pilot signal.

17. The apparatus of claim 16 wherein the pilot signals are partitioned into pilot sets $S_1, S_2, \ldots, S_{n/m}$, and each pilot set $S_j$ contains m pilot signals.

18. The apparatus of claim 15 wherein the access node comprises a processor coupled to a memory with the processor being configured to control said transmission of pilot signals, said estimation of the channel coefficients and said utilization of the estimated channel coefficients in accordance with executable program code stored in said memory.

19. The apparatus of claim 15 wherein the access node comprises at least a portion of at least one central office of a DSL system.

20. A communication system comprising:
a plurality of transmitters; and
a plurality of receivers;
wherein the transmitters are adapted for communication with respective ones of the receivers over respective channels;
wherein pilot signals are transmitted from respective associated ones of the transmitters, and channel coefficients between the transmitters and a given one of the receivers are estimated and utilized to control at least one data signal sent by at least one of the transmitters to at least one of the receivers;
wherein the pilot signals are partitioned into a plurality of sets of pilot signals such that pilot signals from the same set have respective subpilots that are orthogonal to one another and pilot signals from different sets have respective subpilots that are not orthogonal to one another but are instead quasi-orthogonal to one another; and
wherein the pilot signals are associated with the respective transmitters based on said partitioning of the pilot signals into sets.

* * * * *